United States Patent

Frick et al.

[11] Patent Number: 6,111,381
[45] Date of Patent: Aug. 29, 2000

[54] PROCESS AND APPARATUS FOR PRODUCING A PHOTOGRAPHIC PRINT

[75] Inventors: Beat Frick, Buchs; Jürg Fenner, Dübendorf, both of Switzerland

[73] Assignee: Gretag Imaging AG, Regensdorf, Switzerland

[21] Appl. No.: 09/391,393

[22] Filed: Sep. 8, 1999

[30] Foreign Application Priority Data

Sep. 8, 1998 [EP] European Pat. Off. .............. 98116956

[51] Int. Cl.$^7$ .................................................. H04N 1/195
[52] U.S. Cl. ............................. 318/558; 355/32; 355/54; 353/79; 358/401
[58] Field of Search .............................. 318/558; 355/18, 355/32, 53, 54; 358/400, 401, 402; 347/224, 225, 232, 233; 353/79, 82, 122

[56] References Cited

U.S. PATENT DOCUMENTS

| | | |
|---|---|---|
| 3,995,147 | 11/1976 | Sinnott et al. . |
| 4,516,032 | 5/1985 | Barr . |
| 4,656,525 | 4/1987 | Norris ..................................... 358/280 |
| 4,692,812 | 9/1987 | Hirahara et al. . |
| 4,967,246 | 10/1990 | Parulski et al. . |
| 5,404,206 | 4/1995 | Andoh et al. . |
| 5,818,495 | 10/1998 | Taylor ..................................... 347/226 |
| 5,933,214 | 8/1999 | Satoh et al. ............................... 355/50 |
| 5,953,103 | 9/1999 | Nakamura ................................. 355/32 |

FOREIGN PATENT DOCUMENTS

0 710 019 A2   5/1996   European Pat. Off. .

*Primary Examiner*—Bentsu Ro
*Attorney, Agent, or Firm*—Burns, Doane, Swecker & Mathis, LLP

[57] ABSTRACT

For the production of a photographic print of an original present in electronic format, optical representations (D) are produced from sequentially changing strip-shaped portions of the original by way of an electro optical, pixel wise operating converter device (3) and these optical representations (D) are projected onto a strip-shaped exposure region (E) on the copy material (P), whereby the strip-shaped exposure region (E) and the copy material (P) are moved relative to one another and at an essentially constant speed in a direction transverse to the longitudinal extent of the strip-shaped exposure regions (E), so that successively the image information of the whole original is exposed onto the total available surface of the copy material (P). Each strip-shaped portion of the original is thereby divided into at least two strip-shaped sections positioned one behind the other in longitudinal direction of the portion, separate optical representations are produced from the sections by way of the electro optical converter device (3) and these separate optical representations of the sections are projected onto the copy material (P) in at least two strip-shaped partial exposure regions (E1, E2) which are positioned one behind the other in longitudinal direction and together form the strip-shaped exposure region (E). A digital micro mirror field is preferably used as the electro optical converter device (3). In this manner, large format photographic prints of high quality can be produced with relatively low constructive cost by using conventional converter devices.

18 Claims, 8 Drawing Sheets

PROCESS AND APPARATUS FOR PRODUCING A PHOTOGRAPHIC PRINT

This application claims priority under 35 U.S.C. §§119 and/or 365 to European Patent Application No. 98116956.8 filed in Europe on Sep. 8 1998; the entire content of which is hereby incorporated by reference.

FIELD OF THE INVENTION

The invention relates to a process and an apparatus for producing a photographic print, especially a copy of an original present in electronic format, by strip wise projecting the picture information of the original onto a photographic copy material.

BACKGROUND ART

Digital print-producing apparatus on a photographic basis, so-called digital photographic printers, produce prints or copies by projecting the image information of the underlying original present in electronically stored format onto a photo sensitive copy material. One possibility therefor consists in that the image information of the original is optically represented as an image by way of an appropriate electro optical, pixel-wise operating converter device, i.e., to produce an optical representation of the original and to project this optical representation of the original onto the copy material and thereby expose it thereonto. As electro-optical converter devices can thereby be used both active (self-illuminating), as well as passive (modulating) electro optical arrangements; typical examples are cathode ray tubes, liquid crystal cell fields operated in transmission or reflection mode, light emitting diode fields, electro luminescence cell fields and lately also so-called digital micro mirror fields.

One deciding factor for the quality of photographic pictures or copies made in this manner is the resolution (pixel number) of the electrooptical converter device used. While smaller converter devices of sufficiently high resolution are available at economically justifiable prices, the development of economically producible and commercially useable large surface converter devices of corresponding resolution is still in the beginning. Thus, with the available converter devices, only pictures of relative small format can be produced with satisfactory quality.

Through line-by-line or strip-wise projection, theoretically, arbitrarily large photographic pictures can be produced in direction transverse to the lines or strips.

Only strip-shaped sections of the original which in their longitudinal direction cover the whole original are hereby sequentially optically depicted and sequentially projected onto the copy material in a corresponding spatial relationship. The correct spatial positioning of the projected strips is thereby caused by relative displacement of the copy material relative to the path of the projection light path. The latter can be achieved by advancement of the copy material or by a correspondingly moveable projection optics. The relative displacement occurs of course synchronously with the change of the projected strips of the original. If the strips are several lines wide, adjacent strips can also overlap. Since the copy material is multiply exposed, depending on the degree of overlap, this must be correspondingly considered for the adjustment of the amount of copying light for the individual exposure steps. This exposure process is commonly known under the designation TIG (Time Integration Grayscale).

For this process of the line-by-line or strip wise projection comparatively favourable linear converter devices can be used. Under that, one understands rectangular converter element arrangements (fields), the width of which is significantly smaller than their length. In the extreme case, such a linear converter device includes only a single row (line) of converter elements, typically, however, up to several hundred rows. In longitudinal direction such a linear converter device typically has one thousand or more converter elements (per row or line). Of course, wider converter devices (with a higher number of rows) can be used, whereby not all rows (i.e., not the whole width) need be used.

With the above-described methods, qualitatively satisfying photographic prints can only then be produced with the use of the commercial converter devices, when the format of the picture to be produced is relatively small in longitudinal direction of the projected strips. The resolution of the commercial, economically acceptable converter devices is, however, in many cases insufficient for print formats which are also larger in the other dimension.

SUMMARY OF THE INVENTION

With the present invention, a process and apparatus of the generic type is to be improved such that prints of larger format can also be produced, without large additional technical cost, atf satisfactory quality, and in an economical manner. This is to be especially possible with the use of commercially available and economically acceptable converter devices, which means no special and, thus, correspondingly more expensive converter devices of high resolution and larger size are to be required.

The solution of the object underlying the present invention results from the features of the process in accordance with the invention and the apparatus in accordance with the invention wherein the projection strips or lines are subdivided.

According to the principle idea of the invention, the resolution of the produced photographic print is achieved by a longitudinal division of the individual strip-shaped portions of the original into two or more sections and by a correspondingly sectional projection. Since the full length of the converter device is hereby respectively used only for the depicting of a single section, a doubling or multiplying of the resolution results in longitudinal direction of the strips and corresponding to the number of sections so that even with conventional converter devices, prints of very large format can be produced with satisfactory quality.

Further advantageous and especially practical embodiments of the process in accordance with the invention and the apparatus in accordance with the invention are described in the dependent claims and in the detailed discussion below.

BRIEF DESCRIPTION OF THE DRAWINGS

The invention will be further described in the following with reference to the drawing. It show.

DETAILED DESCRIPTION OF THE INVENTION

Figure 7:
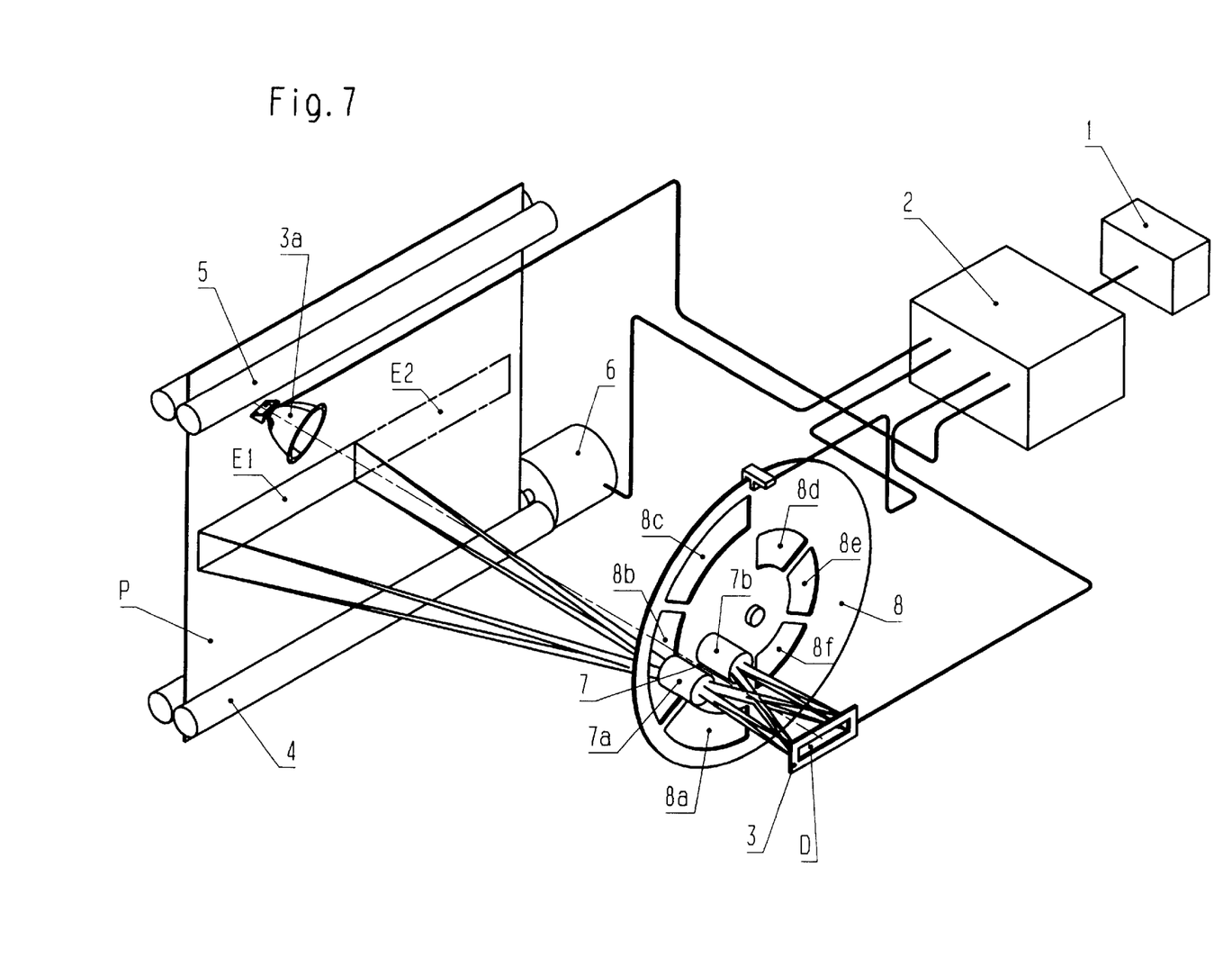
FIG. 7 a schematical sketch of a first embodiment of the apparatus in accordance with the invention.

For the following, it is presumed that the original from which a physical photographic print or copy is to be produced is present in electronically stored format. The image information of the original which, in total, is composed of all brightness and colour information for each individual picture point of the original to be copied resides thereby in a memory 1, from which it can be recalled for each picture point and possibly separated into colour portions by way of a control 2 (FIG. 7). Analogously, the image information of a strip shaped section of the original refers to the total brightness and colour information of those picture points of the original which belong to the respective strip-shaped section of the original.

Figure 1:
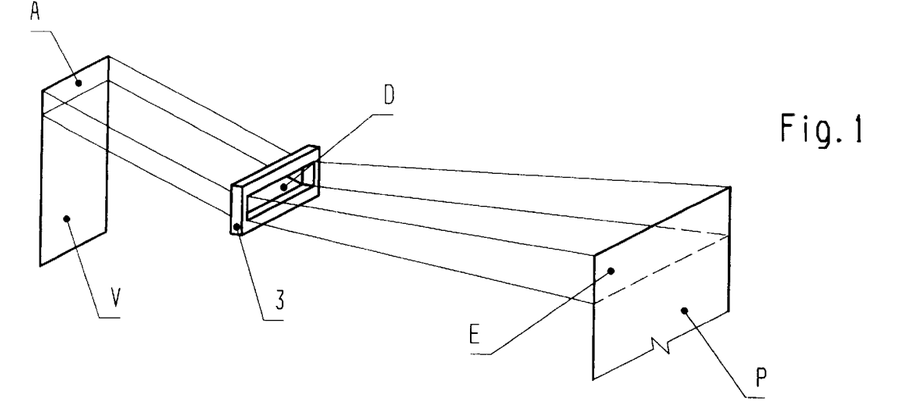
FIGS. 1 to 3 the schematic sketches for the explanation of the principle of the strip-shaped exposure used in the process in accordance with the invention.
Figure 2:
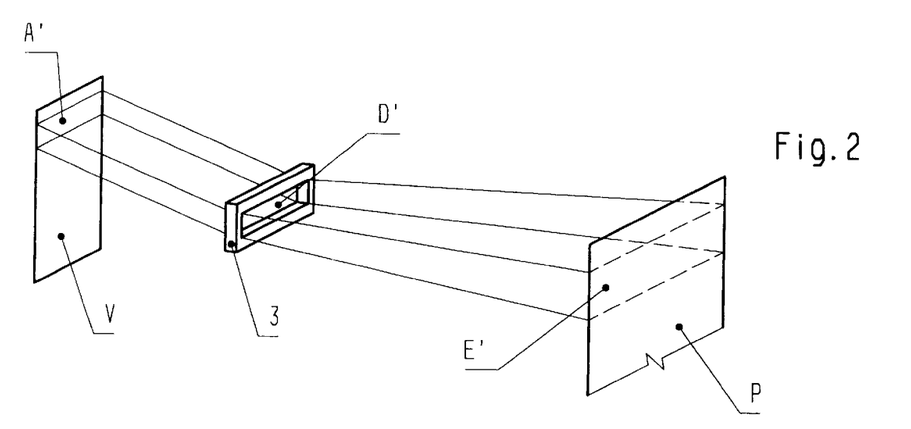
Figure 3:
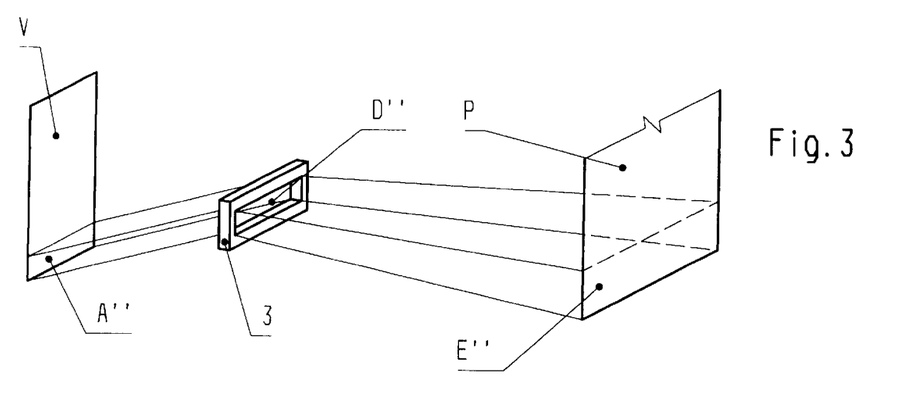

FIGS. 1 to 3 illustrate the principle of the line-by-line or strip-wise projection. The original which is represented by the total of all stored brightness and colour information for each of its individual picture points is designated V. The control 2 which is not illustrated here, reads the image information of a first strip-shaped section A from the original V and controls therewith a pixel wise operating electro optical converter device 3, which by way of the signals supplied thereto produces a pictorial optical representation D of the strip-shaped section A. The electro optical converter device 3 can be formed, for example, by a light emitting diode field with, for example, 1280×300 individual diodes or preferably, as discussed further below, a digital micro mirror field with a corresponding or a larger proportion of individual mirrors. The also strip-shaped optical representation D of the strip-shaped portion A of the original V which is produced by the electro-optical converter device 3 is now projected by a not illustrated projection optics in a (in this example stationary) strip-shaped exposure region E onto a photographic copy material P and thereby projected thereonto (FIG. 1). Thereafter, a subsequent strip-shaped portion A' is read out, and an optical representation D' produced therefrom, which is projected onto the copy material P which has been advanced at the same time by a corresponding distance relative to the exposure region E (FIG. 2). The whole is now repeated until the whole original is captured and the last strip-shaped portion A" of the original is read out, and an optical representation D" is produced therefrom which is projected onto the copying material P (FIG. 3).

As is apparent, the strip-shaped portions A of the original do not lie side by side but overlap to a large degree (transverse to their longitudinal direction). This results in overlapping of the strips projected onto the copy material P, so that the copy material P is multiply exposed, depending on the degree of overlap. This multiple exposure is taken into account in that the brightness values of the individual picture points of the optical representations D of the sections A are (possibly colour selective) correspondingly reduced by the control 2 so that the copying light amounts impinging on the copy material in the respective picture points are in total again correct. This exposure method is generally known under the designation TIG (Time Integration Grayscale).

Up to this point, the described process corresponds to the prior art and, therefore, does not require any further discussion.

As is apparent, the length of the strip-shaped portions A which cover the whole width of the original, corresponds to the length (the useable surface) of the electro optical converter device 3. The resolution in longitudinal direction of the strip is thereby set given by the number of the individual pixels of the converter device 3 in longitudinal direction.

However, with the commercial converter devices available today (maximum pixel number in longitudinal direction about 1280), the achievable resolution for larger enlargement scales (pictures of large format) is in many cases qualitatively insufficient. This is where the present invention begins.

According to the most basic idea of the invention, the strip-shaped portions of the original are divided into two or more sections positioned in longitudinal direction one after another, and a separate representation is produced for each section by way of the electro-optical converter device, which section fills the whole length of the converter device. These separate representations are then projected onto the copy material in the right position and in longitudinal direction one after another by way of a projection optics especially constructed for this purpose, so that the projected partial strips together again contain the image information of the strip-shaped portion of the original consisting of the sections. By way of this division of the strip-shaped portions of the original into two or more sections, a double or multiple of the pixel number in longitudinal direction of the converter device is available for each strip-shaped portion of the original, so that even for copies of very large format (typically up to a format of 12"×18"), a sufficiently high resolution and, therefore, high picture quality is achievable.

Figure 4:
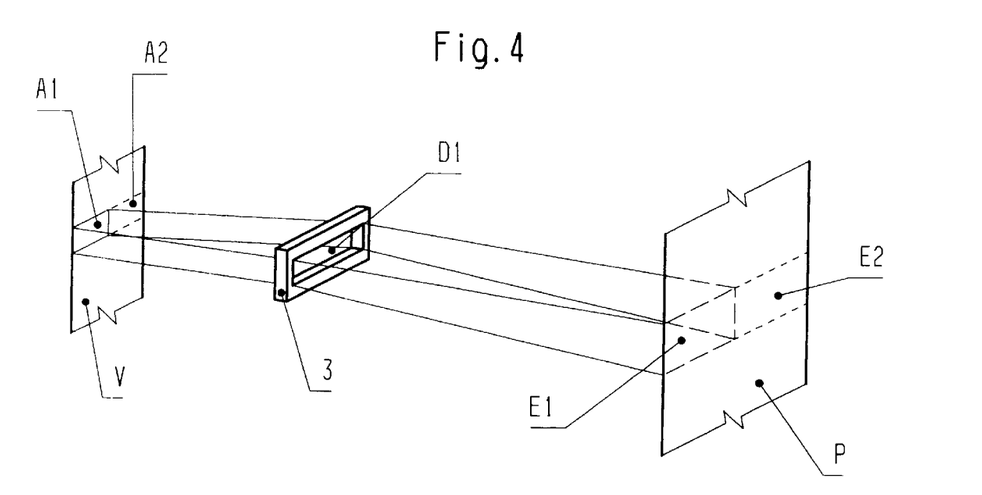
FIGS. 4 to 5 two schematical sketches for the explanation of a first embodiment of the process in accordance with the invention.
Figure 5:
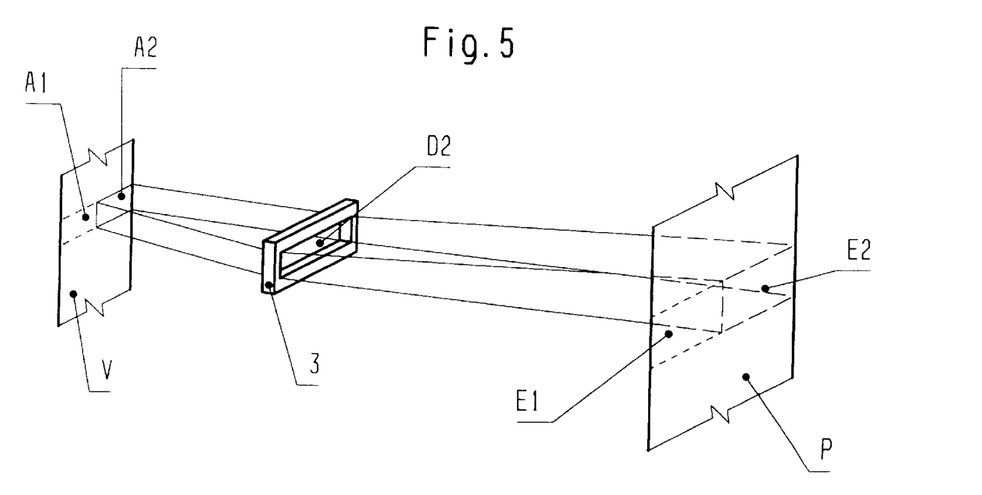

FIGS. 4 to 5 illustrate the principle of the process in accordance with the invention by way of an example wherein each strip-shaped portion A of the original V is divided into two sections A1 and A2. FIG. 4 shows how an optical representation D1 is produced from the section A1 by way of the electro optical converter device 3, and the representation is projected in a partial exposure region E1 onto the copy material P. FIG. 5 shows the same, however, for the section A2, the corresponding optical representation D2 and the partial exposure region E2. The production of the two representations D1 and D2 and the projection onto the copy material takes place sequentially.

Figure 6:
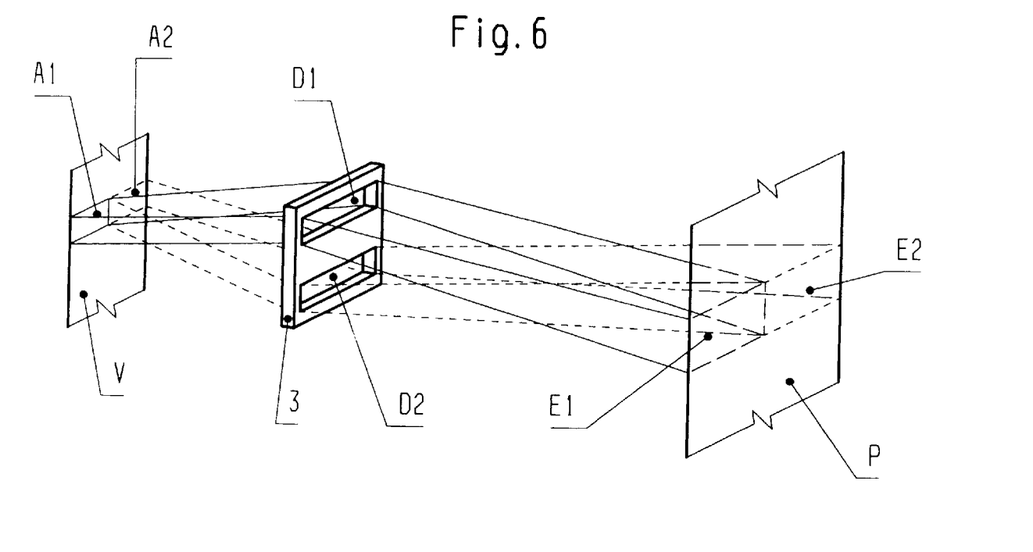
FIG. 6 a schematical sketch for the explanation of a second embodiment of the process in accordance with the invention.

FIG. 6 shows a variant of the process in accordance with the invention, wherein a somewhat wider electro optical converter device 3 is used so that respectively two strip-shaped sections of the original can be depicted simultaneously and locally parallel by way of the same converter device by using different pixel regions. From the strip-shaped section A1 of the original V, the upper representation D1 in the drawing is produced and from the other section A2, the lower representation in the drawing, and both these representations are exposed onto the copy material simultaneously and in two strip-shaped partial exposure regions E1 and E2 in the correct position, one behind the other by way of a not illustrated projection optics constructed especially for this purpose, FIG. 7 shows a practical embodiment of the apparatus in accordance with the invention. Apparent are the electronic memory 1 for the original to be copied, the control 2, the electro-optical converter device 3 and the photographic copy material P, which is positioned between transport roller pairs 4 and 5 in an exposure plane. A drive motor 6 drives the transport roller pair 4 and forms together therewith drive means for adjustment of the copy material P relative to the exposure light path. The electro-optical converter device here illustrated is of the passive type (for example, in the form of a liquid crystal cell field operated in reflection mode), which cooperates with a light source 3A, the light of which is modulated according to the image information fed thereto through the control 2 in order to so produce a pictorial representation of the image information fed thereto. Between the electro optical converter device 3 and the exposure plane of the copy material P, a projection optics 7 consisting of two separate lenses 7A and 7B is positioned as well as a filter wheel 8 rotatably driven by a not illustrated drive motor, the rotation of which is controlled by the control 2. The two lenses 7A and 7B are so constructed and adjusted that the one lense 7A projects onto the copy material P the optical representations of sections of the original produced by way of the converter device 3 in the left partial exposure region E1 in the drawing, and the other lense 7B the representations in the right partial exposure region E2 in the drawing. The filter wheel 8 two times includes 3 colour filters 8A, 8B, 8C and 8D, 8E, 8F in the additive base colours red, blue and green conventional for colour photography. The colour filters are positioned along two concentrical tracks which are respectively associated with one of the two lenses 7A and 7B. With each rotation of the filter wheel 8 are thereby first three colour filters sequentially moved into the light beam after the lense 7A and their three colour filters into the light beam after the lense 4B, whereby the beam of the respectively other lense is interrupted by the filter wheel 8 which simultaneously also acts as shutter so that respectively only one of the two lenses 7A and 7B is active. During the transition from one to the other lense 7A or 7B, the electro optical converter device 3 is maintained dark by the control 2. Of course, the colour filter and shutter function could also be realized by corresponding separate optical means, for example, rotating or pivoting colour filters and a rotating or pivoting sector shutter. The rotation of the filter wheel 8 is synchronized by the control 2 with the read out of the image information from the memory 1. For each read out of a whole strip-shaped portion of the original, here divided into two sections, the filter wheel 8 carries out (at least) one complete rotation so that in each partial exposure region E1 and E2, three colours selective sequential partial exposures take place.

An especial advantage of the apparatus in accordance with the invention resides in that it can be realized with relatively small additional costs (compared to conventional apparatus of this type). Essentially, only a special projection optics 7 is required; for the production of the optical representations of the sections of the original, one can fall back on the same electronic hardware components which are also used in the known apparatus of this type. The software, i.e., the programming, of the control 2 which commonly is equipped with a computer, must be amended such that instead of the whole portion respectively only sections of the original are read out and optical representations produced therefrom. This adaptation can be carried out by the skilled person without inventive ingenuity and in a known manner and, therefore, does not require special explanation.

Figure 8:
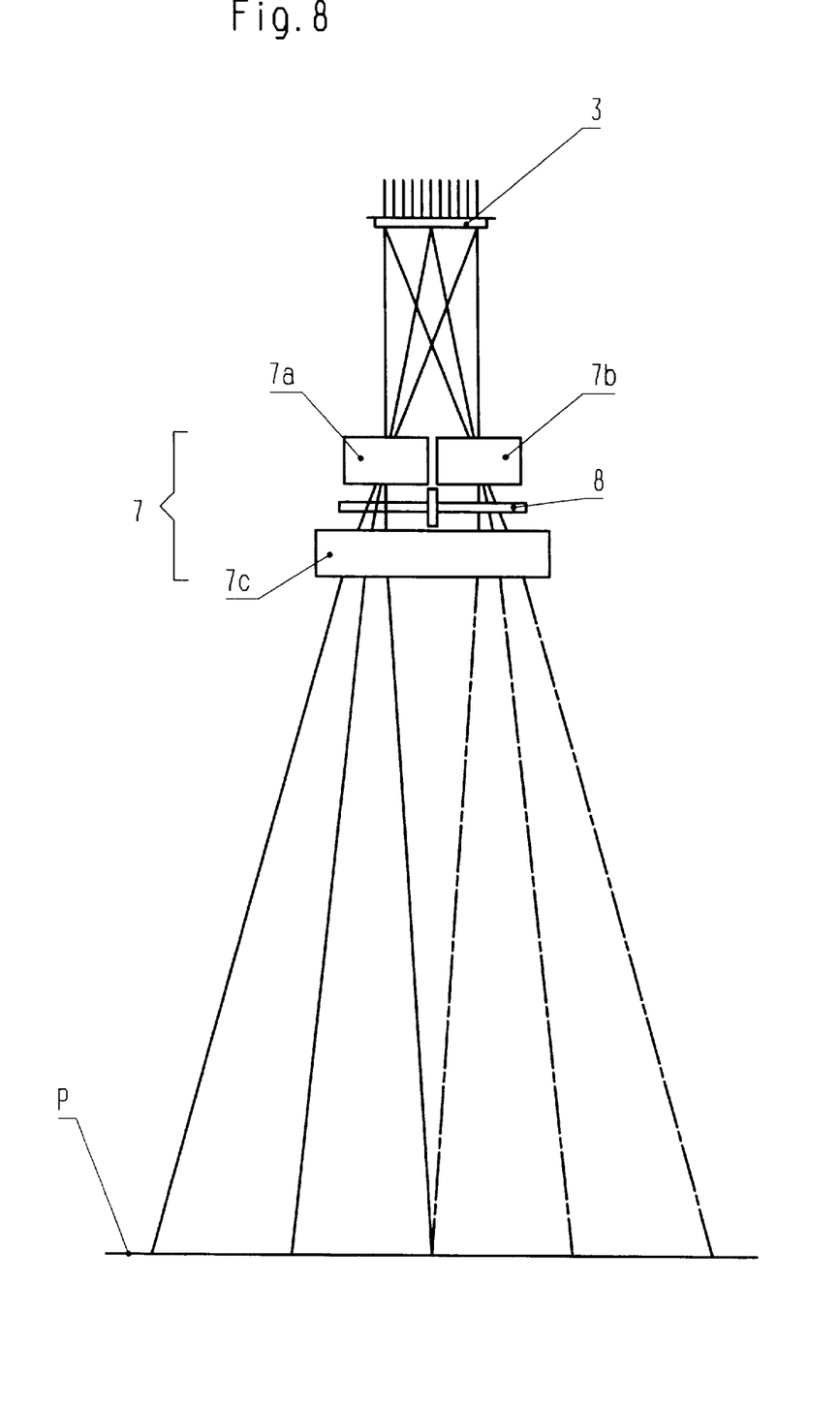
FIG. 8 a schematical illustration of a practical embodiment of a projection optics suited for the apparatus.

An especially practical embodiment of a projection optics 7 is illustrated in FIG. 8. It consists here of two smaller lenses 7A and 7B positioned parallel to each other and a larger lense 7C, the opening of which symmetrically covers the opening of the two other lenses. The rotating filter wheel 8 is positioned between the two lenses 7A and 7B on one hand, and the lense 7C on the other hand. The two lenses 7A and 7B project the converter device 3 or the optical representations produced thereby to infinity, while the lense 7C provides for the focussed projection onto the copy material P. This division of the projection optics into three lenses has the advantage that for a change of the enlargement scale, only the larger lense 7C has to be exchanged or adjusted, while the two other lenses, 7A and 7B together with the filter wheel 8, remain stationary and unchanged so that their relatively costly adjustment need only be carried out a single time. The lense 7C can also be constructed as a zoom lense.

The projection optics 7 of FIG. 8 can also be used when by way of the converter device 3, two parallel representations are simultaneously produced as schematically shown in FIG. 6. The two lenses 7A and 7B must then be adjusted so that they project the two optical representations in longitudinal direction one behind the other onto the copier material. In this case, an image field shutter must be positioned close to the exposure plane, which means closely before the copy material P and the shutter function of the filter wheel 8 must be dropped so that the two lenses 7A and 7B are not alternatively, but simultaneously active.

As already mentioned, it is required for the strip-wise projection that a relative movement takes place between the strip-shaped exposure region E and the copy material P. In the embodiment according to FIG. 7, this occurs by a corresponding advancement of the copy material P. Alternatively and especially practically, the relative movement can be achieved by a moveable construction of the projection optics, whereby the copy material remains stationary during the whole projection. The principle of such a moveable projection optics is shown in FIGS. 9 and 10, whereby the two or three lenses 7A and 7B or 7A to 7C of the FIGS. 7 and 8 are representatively illustrated by a single lense 7 for reasons of simplicity.

The movability of the projection optics or the relative movement of the exposure strip E relative to the copy material P is achieved by redirecting mirrors 9A, 9B and 9C positioned in the light path between the lense 7 and the copy material P, which mirrors are moveable parallel to the plane of the copy material P and in a direction perpendicular to the longitudinal direction of the exposure strip E by a not illustrated drive means. The two redirecting mirrors 9A and 9B are stationary relative to each other and at a right angle to each other so that they redirect the light beam by 180°. The redirecting mirror 9C is positioned parallel to the redirecting mirror 9B and redirects the beam by 90° onto the copy material. The redirecting mirror 9 moves in the same direction as the two redirecting mirrors 9A and 9B but with twice the speed so that the optical distance between the lense 7 and the copy material P remains constant independent of the position of the redirecting mirrors. By movement of the redirecting mirrors in the manner described, the strip-shaped exposure region E is moved across the copy material. FIG. 9 shows the exposure region E and the redirecting mirrors in one end position and FIG. 10 in the other end position.

Of course, the required relative movement can also be carried out by a corresponding adjustment of the whole projection optics (inclusive of the converter device).

Figure 9:
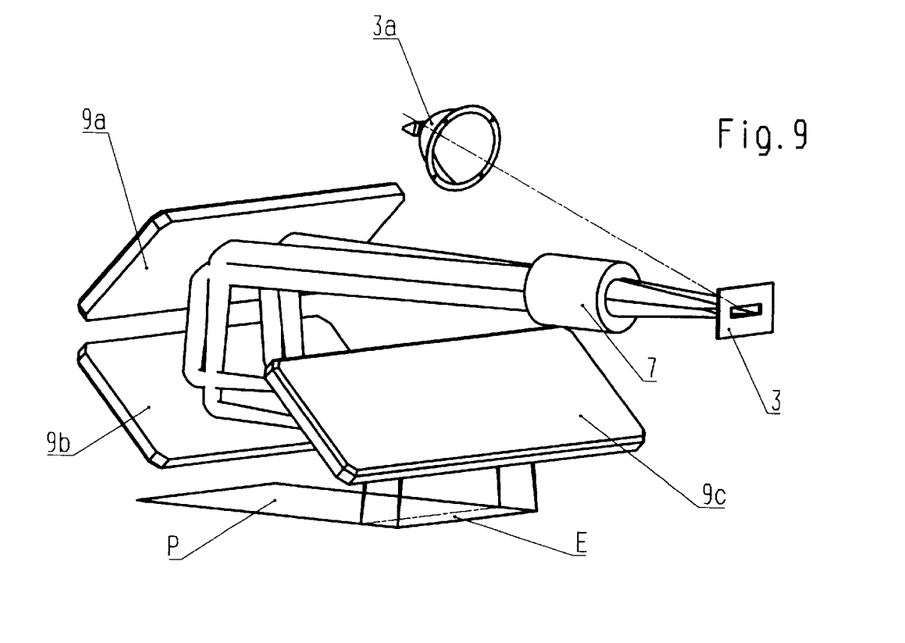
FIGS. 9 to 10 two schematical sketches for the explanation of the relative movement between copy material and exposure strip.
Figure 10:
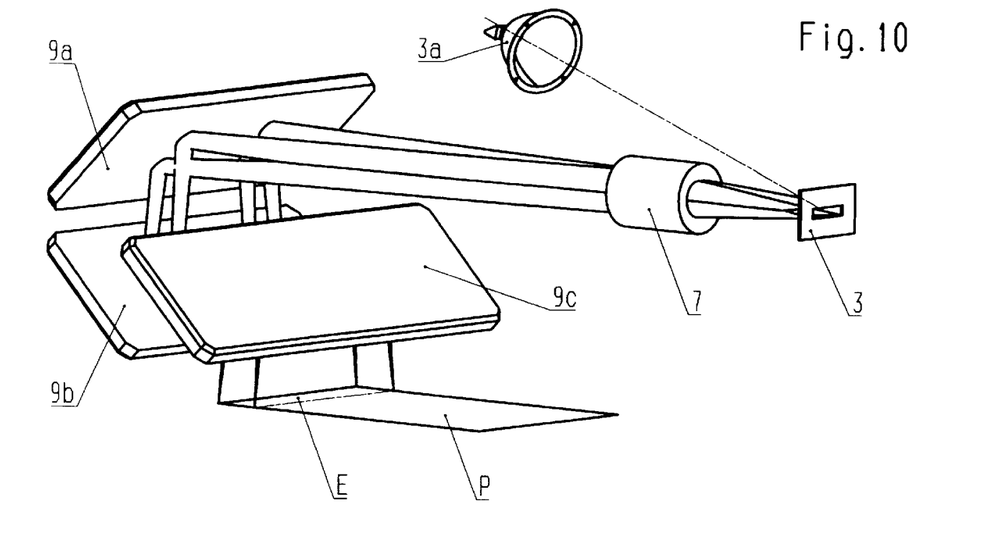
Figures 11, 12:
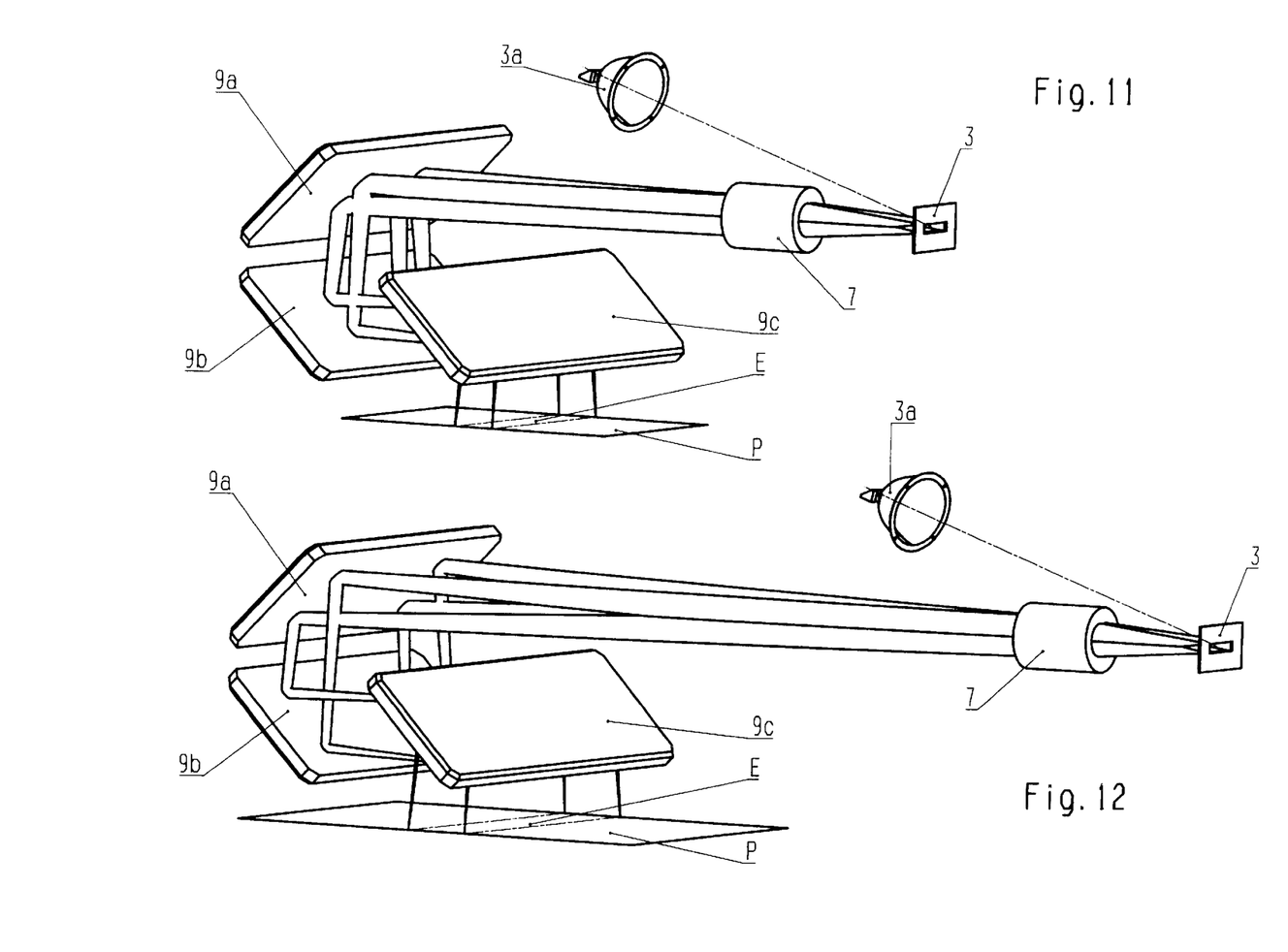
FIGS. 11 to 12 two schematical sketches for the explanation of an exemplary adjustment possibility for the enlargement scale.

FIGS. 11 and 12 illustrate how the enlargement of the projection system can be adjusted with a moveable projection optics according to FIGS. 9 and 10. As is apparent, to achieve this, one only needs to adjust the distance between the lense 7 and the electro optical converter device 3 on one hand, and the optical distance between the lense 7 and the copy material P on the other hand. FIGS. 11 and 12 show the redirecting mirrors and the tense in two different adjustment positions on the enlargement scale. Of course, the enlargement can also be adjusted in another manner, for example, by changing the distance between the redirecting mirror 9C and the copy material P, and by a corresponding adjustment of the lense 7.

Figure 13:
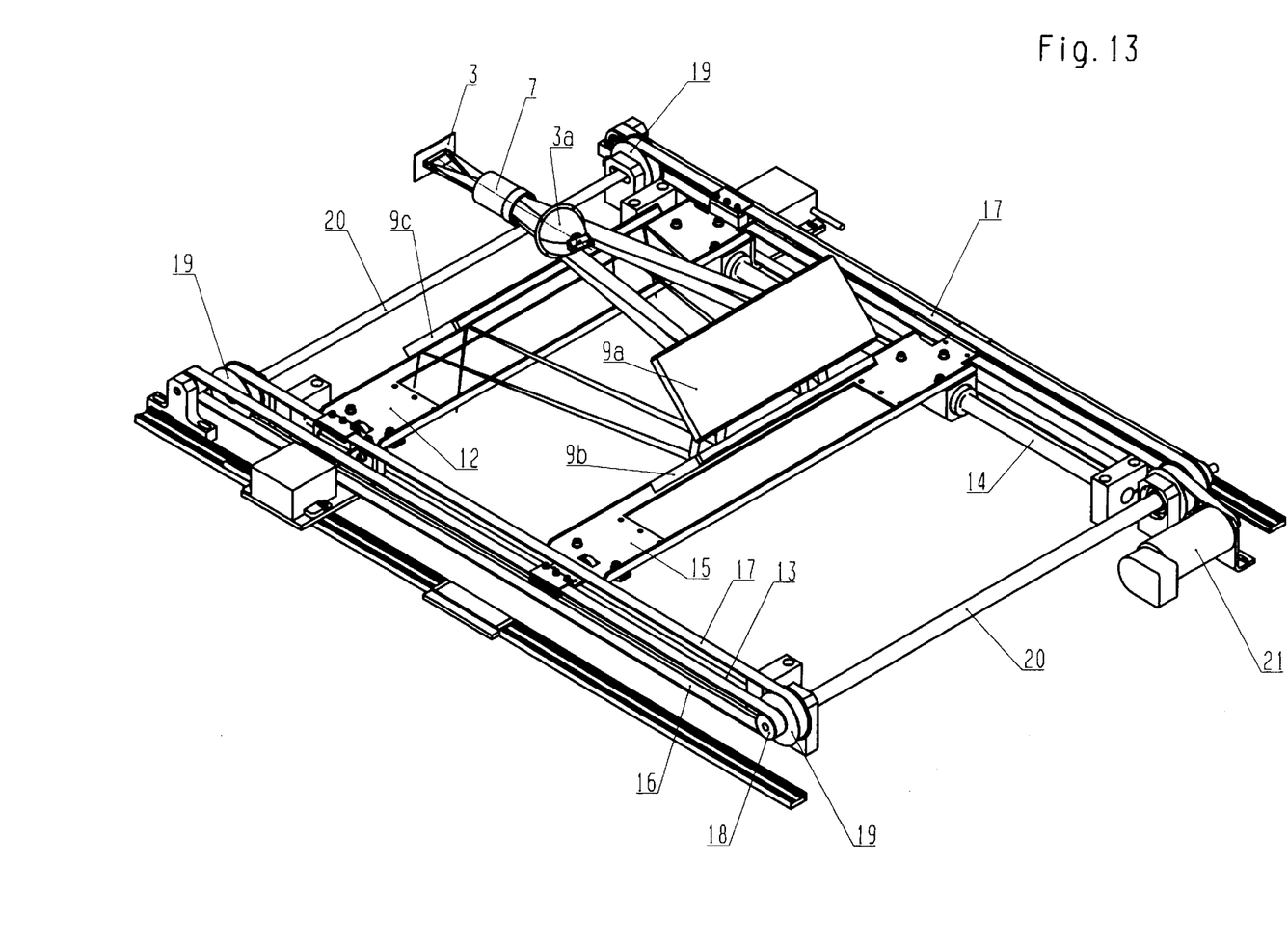
FIG. 13 a partial view of the apparatus in accordance with the invention for the explanation of the mechanical realization of the relative movement between the copy material and the exposure strip analog to FIGS. 9 to 10.

FIG. 13 shows how a projecting arrangement according to FIGS. 9 and 10 can be practically realized. Two guide rods 13 and 14 are mounted in a not shown device frame, on which two mirror sleds 12 and 15 are moveably positioned and parallel to each other. The redirecting mirror 9C is mounted on the mirror sled 12 and the redirecting mirrors 9A and 9B are mounted on the mirror sled 15. To both sides of the two mirror sleds 12 and 15, respectively two transport belts 16 or 17 are tightened between respectively two pulley pairs 18 or 19. The pulleys 18 and 19 sit in pairs on common drive shafts 20 and are synchronously driven by a drive motor 21 controlled by the control 2 which is here not illustrated. The pulleys 18 associated with the transport belts 16 have exactly half the diameter of the pulleys 19 associated with the transport belts 17. The first mirror sled 12 is attached to the transport belts 17 and the second mirror sled 15 is attached to the transport belts 16. The redirecting mirrors 9C or 9A and 9B mounted on the mirror sleds 12 and 15 can thereby be adjusted by way of the drive motor 21 parallel to the guide rods 13 and 14, whereby the redirecting mirror 9C necessarily always moves with twice the speed of the two redirecting mirrors 9A and 9B.

Of course, it is also possible within the framework of the invention to divide the strip-shaped portions of the original into more than two sections A1, A2, A3, . . . , whereby then correspondingly several lenses are provided for the projection and the remaining component s are correspondingly adapted.

In the examples above, the partial exposure regions E1, E2, . . . respectively seemlessly contact. In order to render the whole arrangement less susceptible to adjustment errors, it can be an advantage to somewhat overlap the partial exposure regions (and the underlying sections of the original), for example, by about 1 to 50 pixels. Because of the thereby resulting double exposure in the overlapping region, a corresponding correction (reduction of the brightness) of the representations of the sections of the original produced by way of the converter device is necessary in the regions of overlap. For example, the brightness of the picture points in the regions of overlap can be reduced to zero linearly from the inside to the outside.

In principle, any pixel wise operating, active or passive type of electro optical converter device 3 can be used. Examples therefore are, as already mentioned, cathode ray tubes, light emitting diode fields, electro luminescence fields or liquid crystal fields. Highly advantageous are, however, so-called digital micro mirror fields (DMD=Digital Mirror Device) as are also used, for example, in large picture projection devices. A typical digital micro mirror field suited for the purpose of the invention includes on one chip an array of 1280×1024 mirrors, which can be selectively swivelled between two defined tipped positions by electrical control. For the purpose of the present invention, for example, only a strip-shaped region of the micro mirror field including 1280×300 individual mirrors is used.

Such micro mirror fields are naturally operated in reflection and are also passive. In the practical use, they are so positioned before the pupil of a projection lense so that the micro mirrors direct the light impinging thereon in one tipped position into the projection tense and then the other tipped position past the pupil of the projection lense. Modulation of the intensity of the reflected light is thereby carried out by intermittent control of the micro mirrors with corresponding pulse ratio. Construction, control techniques and possible uses of such digital micro mirror fields are described in detail in the pertinent publications of the manufacturer, for example, the company Texas Instruments, Houston, Tex., USA, in detail and are not the subject of the present invention.

What is claimed is:

1. System for producing a photographic print of an original in electronic format by strip wise projection of image information of the original onto a photographic copy material, said system including an apparatus comprising:
   a memory for the storage of said image information of the original;
   an electro optical pixel-wise operating converter device;
   a control associated with said electro optical converter device for producing optical representations of strip-shaped portions of the original stored in the memory;
   a projection optics for projecting the optical representations of the strip-shaped portions onto a strip-shaped exposure region of the copy material; and
   drive means for shifting the strip-shaped exposure region along the copy material at a constant speed and in a direction transverse to a longitudinal extent of the strip-shaped exposure region, the control dividing each strip-shaped portion of the stored original into at least two longitudinal strip-shaped sections for producing separate optical representations by the electro optical converter device, the projection optics projecting said separate optical representations of the sections onto the copy material in at least two longitudinal strip-shaped partial exposure regions which form the strip-shaped exposure region, wherein the system produces the photographic print original onto the copy material by:
   sequentially producing, by the electro optical, pixel-wise operating converter device, optical representations of the different strip-shaped portions of the original;
   exposing said optical representations onto a strip-shaped exposure region of the copy material; and
   shifting the strip-shaped exposure region along the copy material at a constant speed in a direction transverse to a longitudinal extent of the strip-shaped exposure region to expose image information in the original onto a total available surface of the copy material, wherein:
   each of said different strip-shaped portions is divided into at least two longitudinal strip-shaped sections;
   separate optical representations of said sections are produced by the electro optical converter device; and
   the separate optical representations of the sections are exposed in at least two longitudinal strip-shaped partial exposure regions of the copy material which form the strip-shaped exposure region.

2. System according to claim 1, wherein the optical representations of the sections are exposed onto the partial exposure regions by separate lenses.

3. System according to claim 1, wherein the optical representations of the sections of the original are sequentially produced and exposed onto the copy material.

4. System according to claim 1, wherein the optical representations of the sections of the original are produced locally parallel to one another and simultaneously exposed onto the copy materials.

5. System according to claim 1, wherein the production of the optical representations of the sections and the exposure of the optical representations onto the copy material are carried out sequentially by color.

6. System according to claim 1, wherein a moveable exposure optics facilitates the relative movement between the strip-shaped partial exposure regions and the copy material.

7. System according to claim 6, wherein the electro-optical converter device and the copy material are stationary and the partial exposure regions are moved relative to the copy material by a mirror arrangement which is moveable parallel to the copy material.

8. System according to claim 1, wherein the production of the optical representations of the strip-shaped sections of the original is carried out by a digital micro mirror field.

9. System according to claim 1, wherein the partial exposure regions overlap, and a brightness of image points depicted with the converter device within said regions are reduced to zero to compensate for a double exposure resulting from the overlap.

10. Apparatus for producing a photographic print of an original in electronic format by strip wise projection of image information of the original onto a photographic copy material, said apparatus comprising:
- a memory for the storage of said image information of the original;
- an electro optical pixel wise operating converter device; and
- a control associated with said electro optical converter device for producing an optical representation of strip-shaped portions of the original stored in the memory;
- a projection optics for projecting the optical representations of the strip-shaped portions onto a strip-shaped exposure region of the copy material; and
- drive means for shifting the strip-shaped exposure region along the copy material at a constant speed and in a direction transverse to the longitudinal extent of the strip-shaped exposure region, the control dividing each strip-shaped portion of the stored original into at least two longitudinal strip-shaped sections for producing separate optical representations by the electro optical converter device, the projection optics projecting said separate optical representations of the sections onto the copy material in at least two longitudinal strip-shaped partial exposure regions which form the strip-shaped exposure region.

11. Apparatus according to claim 10, wherein the projection optics includes separate lenses for the projection of the separate representations of the sections of the original in the partial exposure regions.

12. Apparatus according to claim 10, wherein the control associated with the electro optical converter device produces the separate optical representations of the sections sequentially and the projection optics sequentially projects the separate optical representations onto the copy material.

13. Apparatus according to claim 10, wherein the control associated with the electro optical converter device produces the separate optical representations of the sections of the original locally parallel to one another and the projection optics projects the separate optical representation simultaneously onto the copy material.

14. Apparatus according to claim 10, wherein the control associated with the electro optical converter device produces the separate optical representations of the sections of the original sequentially by color and the projection optics projects the separate optical of representations of the sections sequentially by color onto the copy material.

15. Apparatus according to claim 10, wherein the projection optics includes moveable components for producing the relative movement between the strip-shape partial exposure regions and the copy material.

16. Apparatus according to claim 15, wherein the moveable components include three redirecting mirrors, the mirrors being linearly driven parallel to the copy material and perpendicular to the longitudinal direction of the strip-shaped partial exposure regions,
- a first and a second of said redirecting mirrors being maintained in a fixed spatial mutual orientation for directing a projection light path by 180°,
- a third redirecting mirror being positioned antiparallel to the second redirecting mirror for redirecting the light path perpendicular to the copy material, and
- drive means for moving the third redirecting mirror at a speed that is twice the speed of the first and second redirecting mirrors.

17. Apparatus according to claim 10, wherein the electro optical converter device is a digital micro mirror field.

18. Apparatus according to claim 10, wherein the strip-shaped partial exposure regions positioned by the projection optics overlap and the control reduces a brightness of image points of the sections of the original projected by the converter device to zero to compensate for a double exposure resulting from the overlap.

* * * * *